United States Patent
Victor et al.

(10) Patent No.: US 10,732,107 B2
(45) Date of Patent: Aug. 4, 2020

(54) OPTICAL SENSOR, CAPNOGRAPHY SYSTEM AND METHODS OF USE

(71) Applicant: TELEFLEX MEDICAL INCORPORATED, Research Triangle Park, NC (US)

(72) Inventors: John C. Victor, Kunkletown, PA (US); Michael J. Morris, Jasper, GA (US); Mahmoud R. Shahriari, Tarpon Springs, FL (US)

(73) Assignee: TELEFLEX MEDICAL INCORPORATED, Morrisville, NC (US)

( * ) Notice: Subject to any disclaimer, the term of this patent is extended or adjusted under 35 U.S.C. 154(b) by 599 days.

(21) Appl. No.: 15/502,186

(22) PCT Filed: Aug. 7, 2015

(86) PCT No.: PCT/US2015/044169
§ 371 (c)(1),
(2) Date: Feb. 6, 2017

(87) PCT Pub. No.: WO2016/022897
PCT Pub. Date: Feb. 11, 2016

(65) Prior Publication Data
US 2017/0248519 A1 Aug. 31, 2017

Related U.S. Application Data

(60) Provisional application No. 62/034,387, filed on Aug. 7, 2014.

(51) Int. Cl.
*G01N 21/64* (2006.01)

(52) U.S. Cl.
CPC ........... *G01N 21/64* (2013.01); *G01N 21/645* (2013.01); *G01N 21/6408* (2013.01);
(Continued)

(58) Field of Classification Search
CPC ........... G01N 21/64; G01N 2021/6484; G01N 2021/6441; G01N 2201/1211; G01N 21/6408; G01N 21/645
See application file for complete search history.

(56) References Cited

U.S. PATENT DOCUMENTS 5,518,694 A * 5/1996 Bentsen ............... G01N 21/274
250/458.1
6,468,222 B1 * 10/2002 Mault .................. A61B 5/0833
600/529
(Continued)

OTHER PUBLICATIONS

Carlos Baleizao et al., "Dual Fluorescence Sensor for Trace Oxygen and Temperature with Unmatched Range and Sensitivity," Analytical Chemistry, vol. 80, No. 16, Aug. 15, 20087, pp. 6449-6457, XP055061868.
(Continued)

*Primary Examiner* — Samuel P Siefke
(74) *Attorney, Agent, or Firm* — Baker & Hostetler LLP

(57) ABSTRACT

The present application describes an optical sensor for measuring oxygen gas levels in a medium. The optical sensor includes a substrate having a first and second surface. The optical sensor also includes a first coating applied on the first surface of the substrate. The first coating may include an oxygen impermeable matrix doped with a first fluorophore. The optical sensor may include a second coating applied on the substrate. The present application also describes a capnography system for measuring oxygen including an optical sensor and an algorithm to estimate the maxima of oxygen levels from instantaneous oxygen levels and calculating instantaneous carbon dioxide levels from the difference between average maximum oxygen gas level and instantaneous oxygen gas level.

13 Claims, 7 Drawing Sheets

(52) U.S. Cl.
CPC ........... *G01N 2021/6441* (2013.01); *G01N 2021/6484* (2013.01); *G01N 2201/1211* (2013.01)

(56) References Cited

U.S. PATENT DOCUMENTS

| | | |
|---|---|---|
| 2003/0023180 A1* | 1/2003 | Mault ............... A61B 5/0833 600/531 |
| 2003/0023181 A1 | 1/2003 | Mault |
| 2003/0068827 A1 | 4/2003 | Morris et al. |
| 2004/0020785 A1 | 2/2004 | Minteer |
| 2004/0254501 A1* | 12/2004 | Mault ............... A61B 5/083 600/587 |
| 2008/0119753 A1 | 5/2008 | Ricciardelli et al. |
| 2009/0010306 A1 | 1/2009 | Egami et al. |
| 2011/0073051 A1 | 3/2011 | Taniguchi et al. |
| 2011/0086418 A1 | 4/2011 | Forry et al. |
| 2012/0302908 A1 | 11/2012 | Hemnes et al. |

OTHER PUBLICATIONS

Muhammet Erkan Kose et al., "Preparation and Spectroscopic Properties of Multiluminophore Luminescent Oxygen and Temperature Sensor Films," Langmuir, vol. 21, No. 20, Aug. 23, 2005, pp. 9121-9129, XP055210720.

Sergey M. Borisov et al., "Temperature-Sensitive Europium (III) Probes and Their Use for Simultaneous Luminescent Sensing of Temperature and Oxygen," Analytical Chemistry, vol. 78, No. 14, Jul. 15, 2006, pp. 5094-5101, XP055063408.

* cited by examiner

OPTICAL SENSOR, CAPNOGRAPHY SYSTEM AND METHODS OF USE

CROSS-REFERENCE TO RELATED APPLICATIONS

This application is a National Stage of International patent application PCT/US2015/044169, filed on Aug. 7, 2015, which claims priority to U.S. provisional patent application No. 62/034,387, filed on Aug. 7, 2014, the disclosures of which are incorporated by reference in their entirety.

FIELD

The present application generally relates to an apparatus and method for detecting and measuring the exchange of oxygen and carbon dioxide during respiration. More particularly, the present application relates to an optical sensor in a capnography system used for measuring oxygen and carbon dioxide levels during respiration.

BACKGROUND

Respiration is a natural process whereby oxygen is transported from an air source to cells in tissues, while carbon dioxide is transported from cells in the opposite direction. Respiration is generally achieved through breathing. In particular, organisms with lungs perform the process of breathing through inhalation and exhalation.

Some patients undergoing acute pain therapies involving narcotic regiments are at higher risk of apnea occurrence, e.g., suspension of external breathing, or reduced respiratory rates. Absent continuous monitoring by clinicians, affected patients have a greater likelihood of long-term paralysis and in some cases death.

Conventional devices employed by clinicians, such as pulse-oximeters, only measure perfused oxygen levels in the blood stream. However, these devices lack the necessary means for measuring respiratory gases in the airways and lungs and cannot determine the sufficiency of ventilation and respiration. Moreover, conventional capnography equipment utilizes gas sensors to measure carbon dioxide in side streams of gases pumped from respiratory assist tubing and masks. The side stream is necessary because the conventional gas sensors are too large to be placed in or near a patients airway. The temporal response of the conventional capnography system is dampened by the necessary use of the side stream. Clinically-useful, fine, temporal patterns in gas levels are thus lost to the clinician. Moreover, conventional capnography systems are large, expensive and require high power levels making them impractical for use in in the field for emergency care.

Conventional fiber optic oxygen sensors are known in the art to possess smaller size and lower power requirements. However, optical oxygen sensors respond to changes in oxygen levels and to temperature. Moreover, to correct for temperature-related fluctuations in oxygen readings exhibited by the optical sensors, a separate temperature sensor such as a thermistor is also required. Employing multiple sensors to measure oxygen gas levels often leads to longer detection times. Moreover, the electrical safety advantage of using an optical gas sensor is negated by the necessity of also using an electrical temperature sensor.

What is therefore desired in the art is an apparatus and method capable of measuring sufficient ventilation and respiration in a patient.

What is also desired in the art is an apparatus and method that is capable of accurately measuring ventilation and respiration in a relatively short period of time.

What is also desired is a sensor small enough to measure ventilation and respiration within a patient's airways.

What is yet also desired in the art is a single unitary apparatus capable of measuring oxygen gas levels adjusted for temperature.

What is further desired in the art is a small apparatus for measuring oxygen levels with reduced power requirements.

What is even further desired in the art is an apparatus and method that remotely displays ventilation and respiration measurements to a clinician for further analysis.

SUMMARY

The foregoing needs are met, to a great extent, by the present application, directed to an optical sensor, capnography system and method of measuring oxygen gas levels based upon commonly reported parameters including but not limited to gas partial pressure, gas concentration and dissolved gas concentration, and calculating carbon dioxide gas levels.

One aspect of the present application is directed to an optical sensor for measuring oxygen gas level in a medium. The optical sensor includes a substrate having a first and second surface. The optical sensor also includes a first coating applied on the first surface of the substrate including a first fluorophore having a fluorescence characteristic that is dependent upon temperature. In one embodiment, the first coating may include an oxygen impermeable matrix. The optical sensor includes a second coating applied on the first coating. The second coating includes an oxygen permeable matrix and a second fluorophore having a fluorescence characteristic dependent upon temperature and oxygen gas level. In another embodiment, an oxygen impermeable layer may be applied between the first and the second coatings.

Another aspect of the present application advantageously is directed to a capnography system for measuring oxygen gas level. The system includes an optical fiber having a proximal and distal end. In an embodiment, the optical sensor has the features discussed in the first aspect of the application. The system also includes an excitation source. The excitation source transmits light from the proximal end of the optical fiber to the distal end of the optical fiber. The source preferably excites first and second fluorophores present in the optical sensor. The sensor receives one or more fluorescence characteristics from each of the first and second fluorophores.

In yet another aspect of the present application, a method of determining oxygen gas levels in a respiratory path is disclosed. The method includes a step of illuminating a first and second fluorophore located in a respiratory path with an optical energy source. The method also includes the step of detecting one or more fluorescence characteristics for each of the first and second fluorophores. The fluorescence characteristics of the second fluorophore are dependent upon oxygen gas level and temperature. Meanwhile, the fluorescence characteristics of the first fluorophore are dependent only upon temperature.

There has thus been outlined, rather broadly, certain embodiments of the application in order that the detailed description thereof may be better understood, and in order that the present contribution to the art may be better appreciated. There are, of course, additional embodiments of the application that will be described below and which will form the subject matter of the claims appended hereto.

In this respect, before explaining at least one embodiment of the application in detail, it is to be understood that the application is not limited in its application to the details of construction and to the arrangements of the components set forth in the following description or illustrated in the drawings. The application is capable of embodiments in addition to those described and of being practiced and carried out in various ways. Also, the phraseology and terminology employed herein, as well as the Abstract, are for the purpose of description and should not be regarded as limiting.

As such, those skilled in the art will appreciate that the conception upon which this disclosure is based may readily be utilized as a basis for designing other structures, methods and systems for carrying out the several purposes of the present application. Therefore, the claims shall be regarded as including such equivalent constructions insofar as they do not depart from the spirit and scope of the present application.

DETAILED DESCRIPTION

Figure 1A:
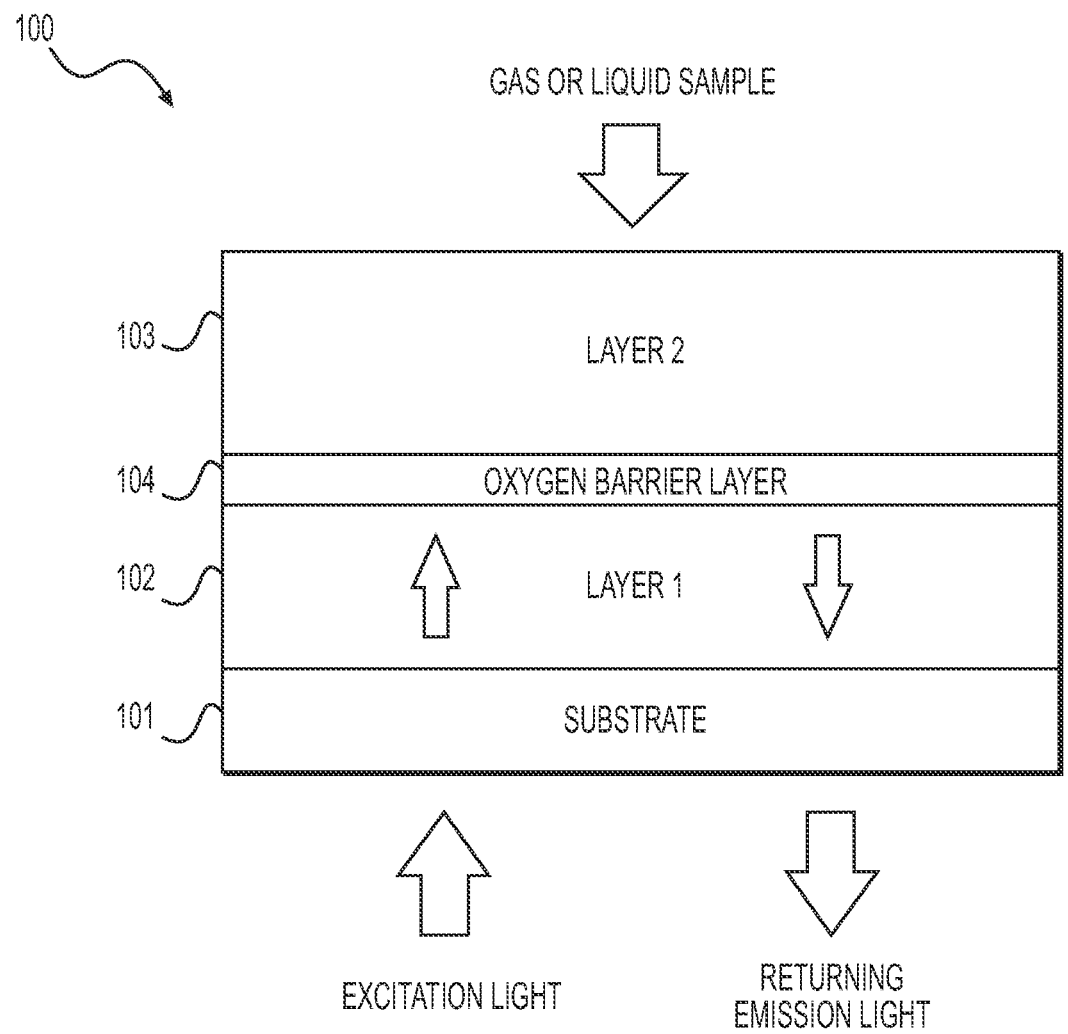
FIG. 1A illustrates an optical sensor structure according to an embodiment of the present application.

The application will now be described with reference to the illustrated figures, in which like reference numerals refer to like parts throughout. The drawings should not be construed as limiting the application. The drawings are intended only to be illustrative.

Reference in this specification to "one embodiment," "an embodiment," "one or more embodiments, or the like means that a particular feature, structure, or characteristic described in connection with the embodiment is included in at least one embodiment of the disclosure. Moreover, the term "embodiment" in various places in the specification is not necessarily referring to the same embodiment. That is, various features are described which may be exhibited by some embodiments and not by the other.

The many features and advantages of the application are apparent from the detailed specification, and thus, it is intended by the appended claims to cover all such features and advantages of the application which fall within the true spirit and scope of the application. Further, since numerous modifications and variations will readily occur to those skilled in the art, it is not desired to limit the application to the exact construction and operation illustrated and described, and accordingly, all suitable modifications and equivalents may be resorted to, falling within the scope of the application.

According to one aspect of the application, an optical sensor is described for measuring oxygen levels in a medium. In particular the optical sensor is configured to provide temperature corrected oxygen levels. Preferably, the optical sensor does not include electrical currents. Accordingly, the optical sensor is intrinsically safe for employing in patients and hazardous environments.

The optical sensor is very small. Specifically, the optical sensor includes plural, thin film layers stacked upon one another. By so doing, the layers exhibit the same temperature such that the accuracy attributed to correcting temperature via one of the layers is enhanced. In one embodiment, the optical sensor is about the diameter of a single optical fiber. By so doing, the optical sensor allows for very fine spatial resolution of oxygen level and/or temperature readings. Even further, the optical sensor of the present application responds fundamentally to the partial pressure of molecular oxygen ($pO_2$) in either gases or liquids. This advantageously allows the user to calibrate the sensor in gases and use the sensor in liquid samples, or they can calibrate in liquids and measure samples in gases. The fundamental measurement of $pO_2$ can further be used to calculate oxygen concentration in gases or liquids in any and all commonly used units of measure collectively described in this document as gas levels.

The medium employed for this technology can include any medium readily known in the art for which oxygen levels are measured. For instance, the medium may be an animal tissue, body fluid or the gases in an animals lungs and respiratory system. Preferably, the animal is a human. The medium may also be any environmental sample or industrial sample where temperature corrected oxygen level readings are desired.

Figure 1B:
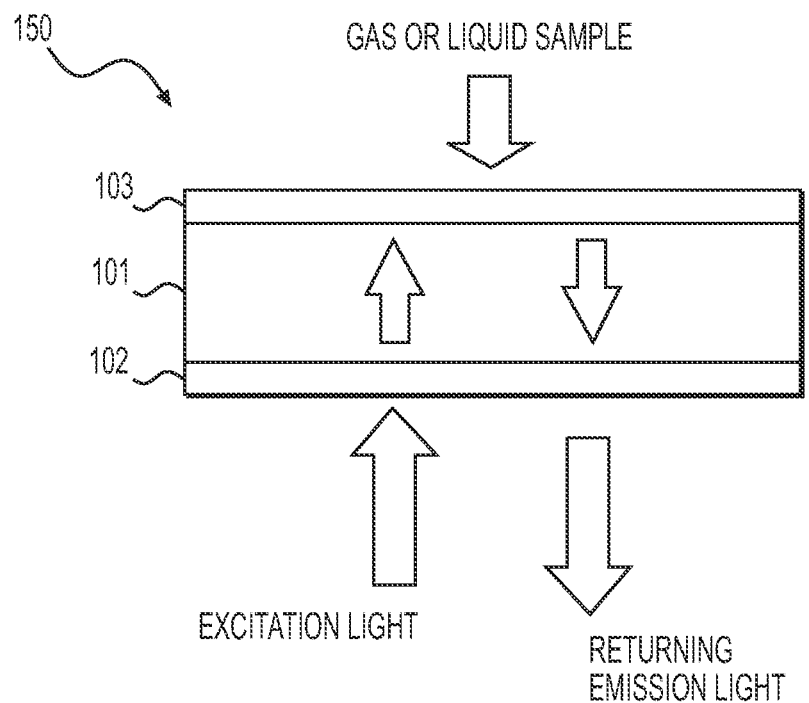
FIG. 1B illustrates a sensor structure according to another embodiment of the present application.

According to an embodiment as shown in FIG. 1A and FIG. 1B, the optical sensors 100, 150, respectively includes a substrate 101. The substrate 101 may be formed in various shapes or geometries for facilitating analysis. For example, the substrate 101 may have a shape that includes but is not limited to a flat panel, a chamber, a receiver cell, a tube, an optical fiber or a channel. The substrate 101 may be made of any suitable material known in the art which is durable and which permits analysis of the oxygen content. The substrate 101 may include any material which permits a light emitted from a light source or from electromagnetic radiation to pass through it. Preferably, the substrate 101 should produce little or no fluorescence background signal. The fluorescence background signal is known to sometimes interfere or block observation of fluorescence of the sample. In one embodiment, the substrate 101 is permeable to oxygen. Alternatively, the substrate 101 is impermeable to oxygen.

According to another embodiment, the substrate 101 may be made of quartz, glass, and plastic. Alternatively, the substrate 101 may include porous scattering substrates such as glass frit. Preferably, the material selected for the substrate 101 should be able to transmit the excitation wavelength of light and the emission wavelengths of light.

The substrate 101 may have a thickness ranging from about 0.5 to 4 mm. Preferably, the substrate thickness ranges from about 1 to 2 mm. Thicknesses less than 1 mm are generally too flexible for use in optical sensors. On the other hand polymers thicker than 2 mm may cause excessive light absorption.

As shown in FIG. 1A, the optical sensor 100 includes a first coating layer 102 deposited on a first surface of the substrate 101. The first coating layer 102 is preferably deposited via spin coating. In another embodiment the first layer is deposited by dip coating. The thickness of the first coating layer 102 ranges from about 0.5 micron to 2 microns. There are gains and losses associated with increasing thickness. The gain is increasing emission leading to improved signal to noise, S/N. Meanwhile, the loss is slower sensor response rate. The first coating layer 102 may be composed of an oxygen impermeable matrix. According to one embodiment, the matrix may include a sol-gel formulation. Preferably, the sol-gel formulation is impermeable to oxygen. This layer is a silica gel matrix which is encapsulates a fluorophore.

The first coating layer 102 may also include a fluorophore. The fluorophore may be caged (encapsulated) in the matrix. As generally understood in the art, fluorophores absorb light energy in specific range of wavelengths. The range of wavelengths that are absorbed depends on both the fluorophore structure and its chemical environment. The absorbed wavelengths are also referred to as the excitation wavelengths. Wavelengths of absorption or excitation for fluorophores range from about 380 nm to 550. The excitation or absorbed energy of light causes the fluorophore to attain an excited state. The fluorophore molecules spontaneously re-emit this energy as light at a longer wavelength than the excitation wavelength. This emission is called fluorescence, luminescence or phosphorescence. The time that is required for the fluorophore to emit the light is called fluorescence lifetime and the rate at which the light is emitted is called fluorescence decay rate. In a preferred embodiment, excitation wavelengths range from 380 to 550 nm and the emission wavelengths range from 550 to 800 nm. In one embodiment, the first coating is oxygen impermeable. In another embodiment the first coating is oxygen permeable if located between two oxygen impermeable layers.

Fluorophores typically contain several combined aromatic groups, or plane or cyclic molecules with several 1T bonds. In one embodiment, the fluorophore shares a common solvent with the matrix. In another embodiment, the fluorophore is selected from Ruthenium organic complexes, Platinum organic complexes and combinations thereof. In a preferred embodiment, the first fluorophore is a Ruthenium organic complex. In an exemplary embodiment, the first fluorophore is RuBipy. The fluorescence lifetime of RuBipy is about 0.5-2.5 microseconds. Other organo-metallic fluorophore compounds such as Pt, Au, Ir, Os and Pd-based compounds may also be used. The preferred compound is RuBipy.

The fluorescence characteristics of the first fluorophore may include but are not limited to one or more of fluorescence intensity, fluorescence decay rate, fluorescence lifetime and fluorescence phase shift. In one embodiment, the fluorescence characteristic is based upon any one of the above mentioned pieces of information. According to another embodiment, at least two of the above-mentioned pieces of information are used. According to yet another embodiment, the fluorescence characteristic is based upon all four of the above-mentioned pieces of information.

The optical sensor 100 also includes a second coating layer 103 that may be deposited on the first coating layer 102 as illustrated in FIG. 1A. The second coating layer 103 may be deposited by spin coating. In another embodiment the second layer maybe deposited on the end of an optical fiber by dip coating. The thickness of the second coating layer 103 ranges from about 0.5 to 2 microns. The second coating layer 103 is dependent upon both temperature and oxygen gas level. Thickness has two opposing effects on optical sensor performance. These include, for example, the effect on response rate and on Signal to Noise Ratio (S/N). If a thicker coating is employed, it will slow down response rate, however it will advantageously increase S/N. The opposite holds true if the thinner coating is used.

The second coating layer 103 also includes a matrix. Preferably, the matrix is permeable to oxygen. In one embodiment, the matrix may include a sol-gel formulation, silicone or polystyrene. Preferably, the matrix of the second coating layer 103 is different from the matrix of the first coating layer 102. Preferably the matrix of the second coating layer 102 is made of polystyrene.

The second coating layer 103 may also include a fluorophore. The fluorophore may be dissolved in the matrix. Generally, the second fluorophore shares a common solvent with the matrix. Preferably, the fluorophore in the second coating layer 103 is different from the fluorophore in the first coating layer 102. In one embodiment, the fluorophore in the second coating layer 103 is a Platinum organic complex. In an exemplary embodiment, fluorophore is a Platinum porphyrin. The fluorescence lifetime of Platinum porphyrin is longer than that of RuBipy as discussed above. The fluorescence lifetime of Platinum porphyrin is about 3-24 microseconds. As oxygen is a fluorescence quencher, the lifetime may generally be about 7 microsends in the presence of oxygen in air, and may generally be about 24 microseconds in the absence of oxygen.

In a further embodiment, an oxygen barrier layer 104 may be deposited between the first 102 and second 103 coating layers as shown in FIG. 1A. The first layer 102 may be rendered oxygen incentive by isolating it from the environment. The oxygen barrier layer 104 may have a thickness ranging from about 10 to 100 microns. Any oxygen barrier layer 104 that is typically used in the art for optical sensors may be employed herein. Preferably, the oxygen barrier layer 104 may include materials selected from PVC, glass, and quartz. The first layer 102 is further isolated from oxygen by selecting an oxygen impermeable substrate. Oxygen impermeable substrates may include materials selected from PVC, glass, quartz. Further isolation from oxygen may be facilitated by sealing the edges of the layers with materials known in the art including but not limited to metal foil.

In a further embodiment, the second layer 103 may be deposited on another surface of the substrate 101 from which the first layer 102 was deposited as illustrated in FIG. 1B. In this embodiment, the first layer may be oxygen impermeable and the second layer 103 may be oxygen permeable. As further shown in FIG. 1B, the excitation light and return emission light may be introduced through the first layer 102. Moreover, gas or liquid samples may contact the second layer 103.

According to another aspect of the application, a capnography system is described for measuring oxygen levels in a medium. The medium may be respiratory gases entering and exiting the airways and lungs of an organism. The medium may contain gases introduced as an aide to respiration. The medium may be tissue, blood, urine or other body fluids of the organism. Preferably, the organism is a human. The capnography system may include an optical fiber as commonly known to one of ordinary skill in the art. The optical fiber may include a polished distal surface. Moreover, an optical sensor, such as the optical sensor described above in FIGS. 1A and 1B, may be disposed on the polished, distal surface of the optical fiber. Preferably, the optical sensor is coated on the optical fiber.

Figure 2A:
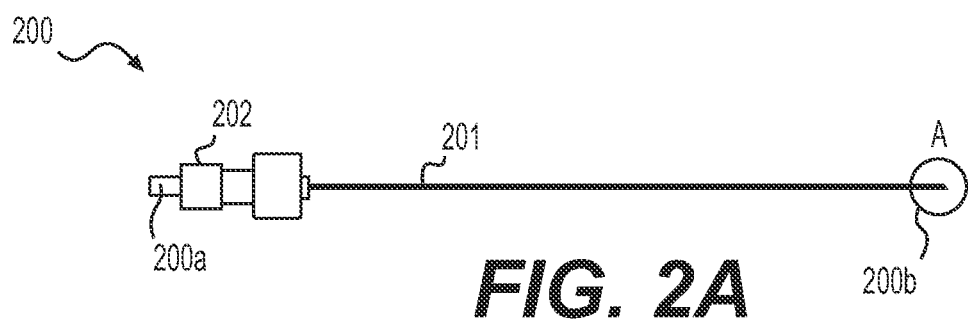
FIGS. 2A-B illustrate a schematic view of an optical sensor disposed on an optical fiber according to an embodiment of the present application.

In one embodiment as illustrated in FIG. 2A, the optical fiber 200 includes a proximal end 200a and a distal end 200b. An optical luer adaptor 202 is disposed on or around the optical fiber 200. The optical luer adaptor 202 allows the optical fiber 200 to be affixed to another device enabling measurement of the $PO_2$ in either a gaseous or liquid environment located in or around an organism. The optical fiber 200 preferably extends in the longitudinal direction from both ends of the optical luer adapter 202. Specifically, as showing in FIG. 2A, an elongate portion 201 extends from a distal end 200b of the optical fiber 200 to one end of the optical luer adapter 202. Another end of the optical fiber (not shown) extends from the optical luer adapter 202 to an emission source and/or excitation sensor. The emission sensor and/or excitation source will be discussed in further detail below.

Figure 2B:

A magnified view of the distal end of the optical fiber 200 shown in FIG. 2A having the optical sensor 100 coated thereon is illustrated in FIG. 2B. FIG. 2B is a ten times (10×) magnification of the view in FIG. 2A. As shown, the optical sensor 100 is coated on a distal end 200b of the optical fiber 200. The optical sensor 100 may also be coated on lateral surfaces of the optical fiber 200 adjacent to the distal end thereof. In an exemplary embodiment, the optical sensor 100 is coated only on a distal, polished surface on a distal end 200b of the optical fiber 200.

Figure 3A:
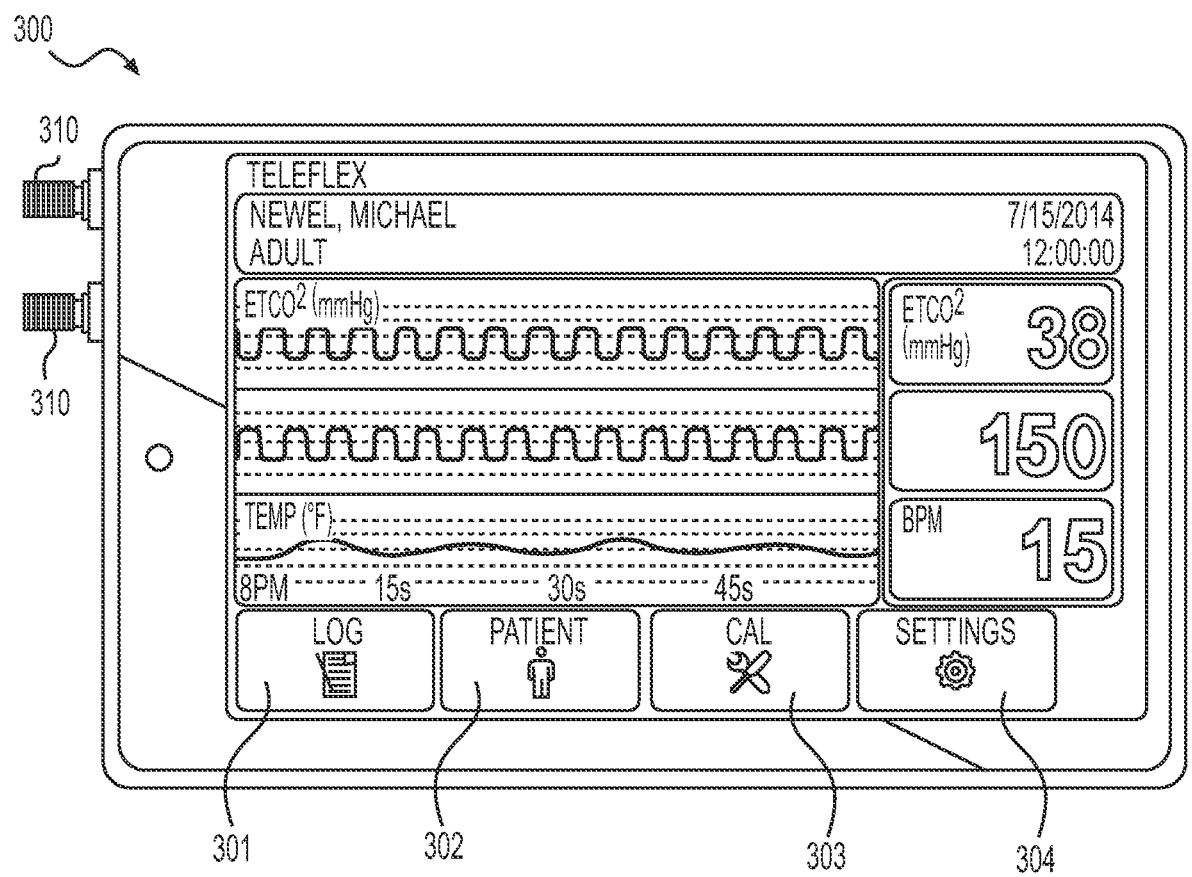
FIGS. 3A-B illustrate a user interfaces according to embodiments of the present application.

A single optical fiber 200 is illustrated in FIGS. 2A-B. Namely, the optical fiber 200 may be employed as a conduit for both receiving and transmitting measurements from an organism. The single optical fiber may be mechanically bifurcated, e.g., split into two fibers at a certain junction, in order to communicate with ports, e.g., optical connectors, for an emission sensor and excitation source. According to one embodiment, the emission sensor and excitation source are housed together in a single user device 300, such as shown in FIG. 3A, with two ports 310 extending therefrom. It is envisaged according to this application that the user device 300 for capnagraphy measurements may include one port and therefore does not require bifurcation of the optical fiber 200. In other words, the user device 300 may further include a beam splitter configured to transmit the appropriate signals to the emission sensor and excitation source, respectively. According to an alternative embodiment, the emission sensor and excitation source may be individually housed with each having their own port.

In FIG. 3A, the device 300 includes multiple functions. For example, the device may include a LOG function 301, a PATIENT function 302, a CAL function 303 and a SETTINGS function 304. The LOG function 301 may allow the clinician to take notes regarding a patient's $etCO_2$, $pO_2$ and temperature values displayed on a display. The PATIENT function 302 may allow a clinician to save results for plural patients requiring capnagraphic measurements. The CAL function 303 stands for calibration of the instrument to ensure accurate measurements. The SETTINGS function 304 allows for the clinician to customize the device 300. For example, the temperature could be read either in celsius or fahrenheit.

According to even a further alternative embodiment, the capnography system may include plural optical fibers which serve as conduits for receiving and transmitting measurements. Preferably, two optical fibers are employed. One of the optical fibers is dedicated for transmitting signals from an excitation source while the other optical fiber receives emission fluorescence ultimately directed to the emission sensor. If more than two optical fibers are employed, optical fibers are grouped into bundles and configured to be operably connected to each of the excitation source and emission sensor.

Figure 3B:
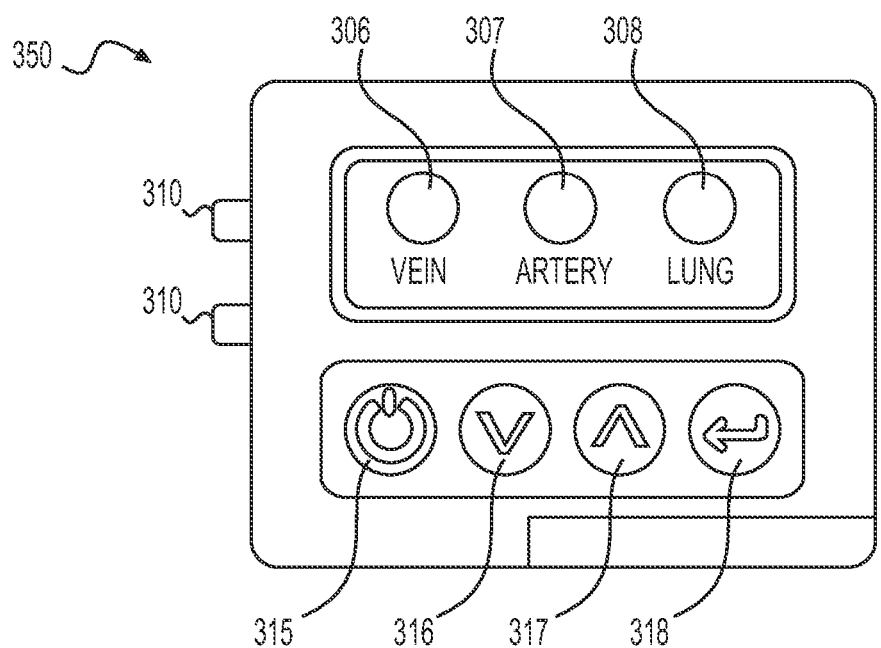

According to another embodiment, a user interface 350 as shown in FIG. 3B includes two ports 310 and one or more indicators when obtaining measurements from a vein, artery or lung. The indicators may be color coded in one embodiment. For example, a blue indicator 306 may illuminate upon the user interface detecting measurements from a vein. Moreover, a red indicator 307 may illuminate upon the user interface detecting measurements from an artery. Also, a pink indicator 308 may illuminate upon the user interface detecting measurements from a lung. This application is envisaged such that measurements may be taken in both gaseous and aqueous environments as discussed above.

In even another embodiment, the user interface 350 shown in FIG. 3B, e.g., graphical display, may include a power on/off button 315. This allows the user interface 350 to be shut down when not in use. The user interface 350 may also include navigation buttons 316, 317 and 318, such as for example, up, down and return.

In one embodiment, the user interface is battery powered. This allows a clinician to transport the user interface without being constrained by static power sources, e.g., power outlet. Alternatively, the user interface is powered by a static electrical source.

According to another embodiment, the capnography system may include an audio device that is operably coupled to the emission fluorescence sensor. The audio device may be separate from, or integrated with, the user interface. The audio device is capable of providing varying sounds based upon measurements received from the patient. In one embodiment, the audio device may include an alarming mechanism which is set off by the signal exceeding a predetermined threshold. By so doing, the clinician may be apprised of life-threatening issues which may be affecting his or her patient.

Figure 4A:
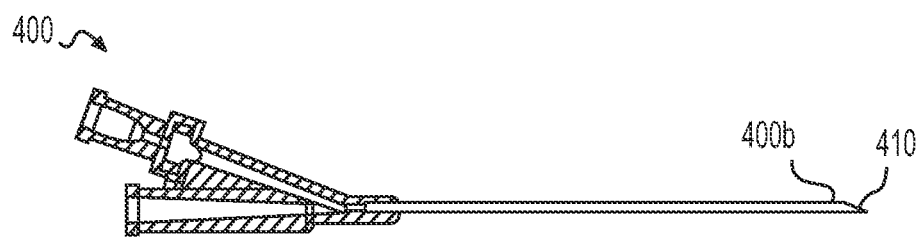
FIGS. 4A-B illustrate devices used in combination with an optical fiber according to an embodiment of the present application.
Figure 4B:
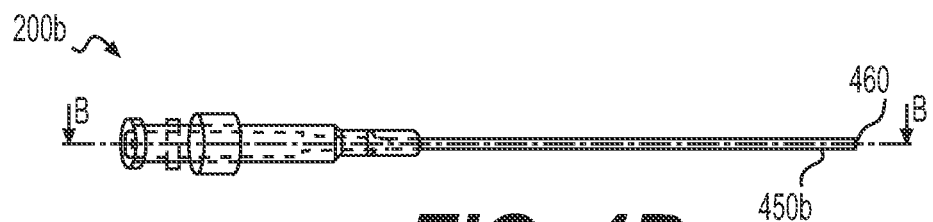

According to yet another embodiment, the capnography system may be employed in combination with another device. For example, the optical fiber 200 in FIG. 2A may be used in combination with another device to assist with entering a cavity or penetrating tissue of a patient to obtain proper measurements. Specifically, the device may include but is not limited to a Raulerson syringe, endotrachial tube, peripherally inserted central catheter (PIPP), central venous catheter (CVC), laryngeal mask airway and a nasal cannula. FIGS. 4A-B illustrate two exemplary devices 400, 450, respectively, which may be employed for housing an optical fiber. The device 400 includes a beveled distal tip 410 extending to one of its lateral sides at a distal area 400b and is preferably configured to penetrate tissue of a patient to obtain a measurement. The device 450 includes a blunt distal tip 460 at a distal area 450b and is preferably configured to enter a cavity of a patient to obtain a measurement.

According to an embodiment, an optical fiber 200 is arranged within device 400 or 450 such that the optical fiber 200 does not move in the longitudinal direction. That is, the optical fiber 200 is fixed in place. In one exemplary embodiment, an optical luer adapter assists with locking the optical fiber in place with the device 400 or 450. Moreover, the optical fiber is oriented such that its distal tip is proximate to a distal area 400b, 450b of device 400 or 450. According to the application, the optical fiber does not extend beyond a distal tip 410 or 460 of the device 400 or 450, respectively. In other words, the optical fiber remains encapsulated within the device 400 or 450.

Figure 5:
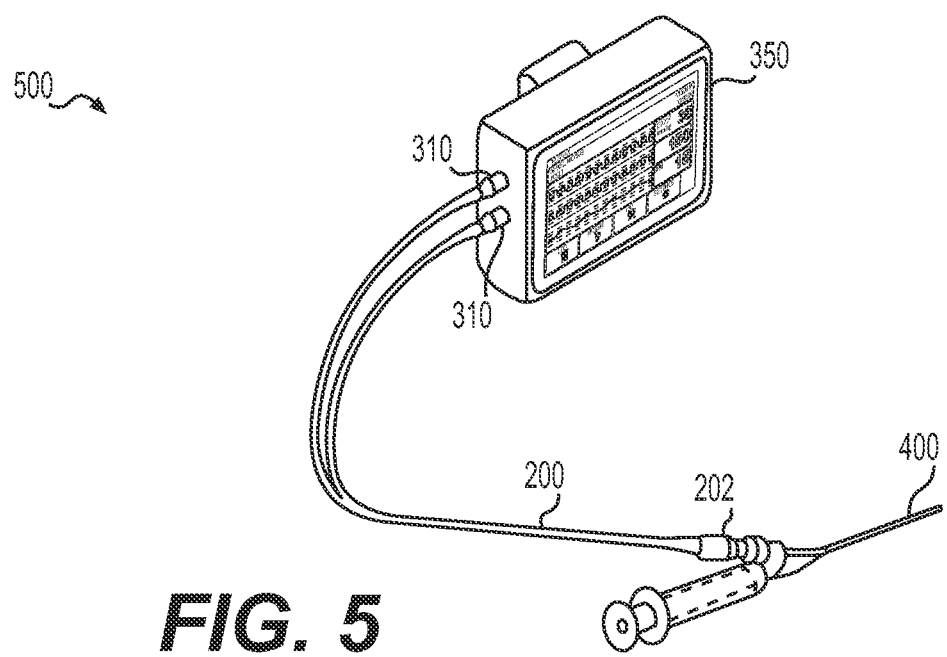
FIG. 5 illustrates a capnography system according to another embodiment of the present application.

According to even another embodiment, FIG. 5 illustrates a capnography system 500 capable of measuring the oxygen gas levels. As shown, two ports 310 of the user interface 350, e.g., graphical display, are connected to bifurcated proximal ends of an optical fiber 200. The elongate end 201 of the optical fiber (not shown) extending distal of the optical luer adapter 202 is located within device 400.

Figure 6:
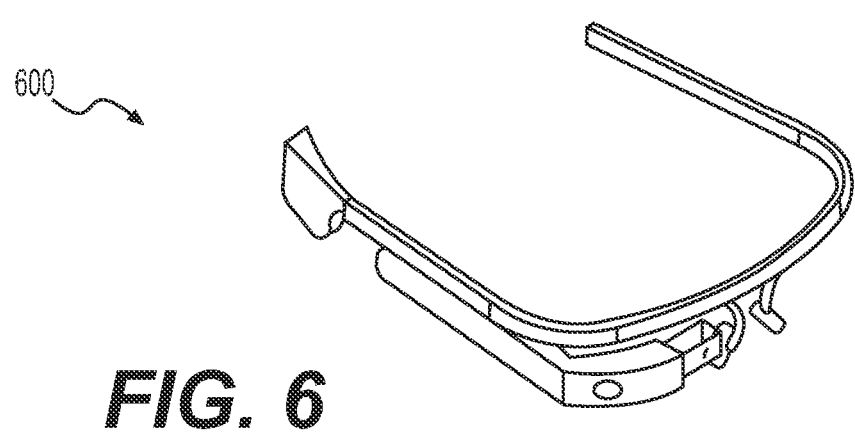
FIG. 6 illustrates a wireless user of the capnography system according to another embodiment of the application.

According to another embodiment, the capnography system 500 may further comprise a wireless interface to a remote user interface or a recording device. In an exemplary embodiment, the remote user interface may be a heads-up display. For example, as shown in FIG. 6, the remote user interface 600 may be wearable technology by a clinician. The remote user interface 600 illustrated in FIG. 6 may be headware, preferably glasses. The headware may also include other devices as envisaged to a person of ordinary skill in the art desiring light-weight wearable technology. By so doing, the clinician's can perform additional functions allowing the ability to multi-task given the availability of both hands.

Figure 7:
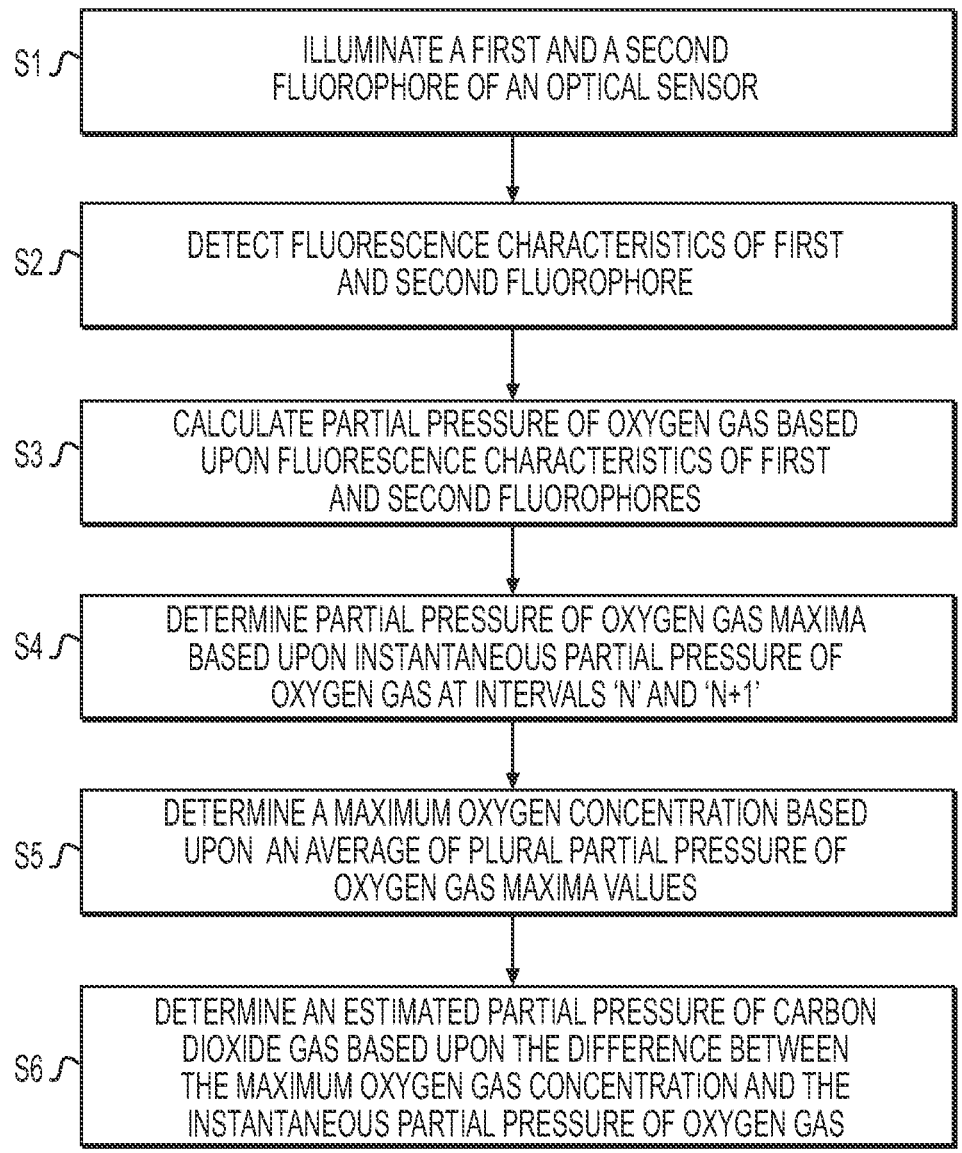
FIG. 7 illustrates the steps to measure a temperature corrected instantaneous oxygen level and to calculate an instantaneous carbon dioxide level.

According to another aspect of the application, a method of determining oxygen gas level in a respiratory path is disclosed. Oxygen gas level is understood to mean partial pressure of oxygen gas or concentration of oxygen gas. In one embodiment, the process 700 as shown in FIG. 7, first and second fluorophores located in the respiratory path are illuminated by an excitation source (S1). Fluorescence characteristics of each fluorophore are detected by an emission sensor (S2). As discussed above, the fluorescence characteristics of one of the fluorophores is dependent upon oxygen gas level and temperature. Meanwhile, the fluorescence characteristics of the other fluorophore are dependent only upon temperature. In other words, it is not dependent upon oxygen gas level. Next, an oxygen gas level is calculated based upon the fluorescence characteristics of the fluorophores (S3). Preferably, one of the fluorophores is employed as a temperature corrector in order to obtain a more accurate decay rate of the second fluorophore relating to the oxygen gas level. Preferably, the electrical components are employed in a user interface 300, such as showing in FIG. 3A. The electrical components of the user interface 300 are designed to automatically change the modulation frequency—between slow and fast—based upon each fluorophore. This embodiment advantageously provides a means to separately measure the decay rates of each of the two fluorophores. The user interface 300 also is configured to measure phase shifts of excitation spectra based upon the two different fluorophores. Moreover, the user interface 300 is configured to store the readings alternating between the two materials. Further, pairs of data from the first and second fluorophores may be used to calculate instantaneous oxygen gas levels.

Figure 8:
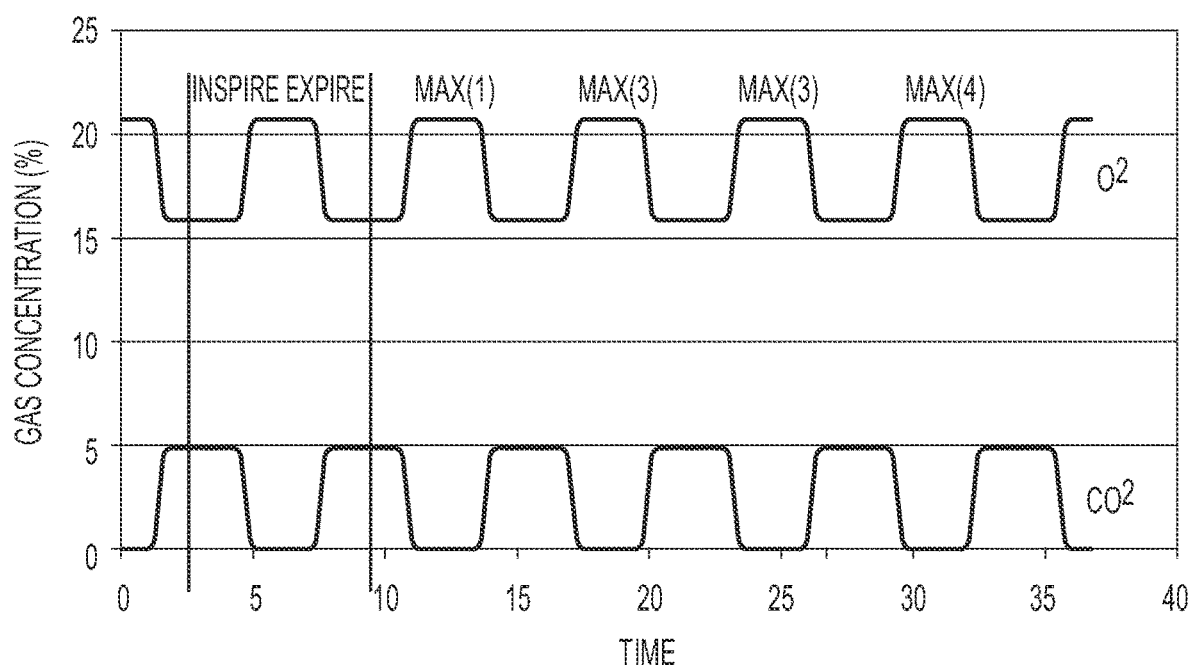
FIG. 8 illustrates instantaneous oxygen and carbon dioxide values versus time or capnograms provided by a capnography system according to an embodiment of the present application.

Moreover, FIG. 8 shows the instantaneous oxygen gas level versus time as provided by the user interface 300 of a capnagraphy system. Moreover this instantaneous oxygen gas level curve provides the clinician information about the breathing rate of the patient. As shown in FIG. 8, oxygen level in the gas flowing past the sensor is high during inhalation and decreases to a lower value during exhalation. The inhalation and subsequent exhalation comprise one breath. Next, the oxygen gas level maximum value during a breath is determined (S4). The maximum is selected from the instantaneous values by calculating the slope or rate of change of oxygen gas level. The slope is calculated as the difference in oxygen at time=n and time=n+1. This slope will be positive during inspiration and will change to negative during exhalation. The time at which the slope changes from positive to negative is the point at which instantaneous oxygen gas level is maximum. The maximum values for several successive breaths preceeding the current values (max1, max2, max3, max4 as shown in FIG. 8) are determined. Further, an average maximum oxygen level is based upon an average of plural oxygen gas maxima values (S5). The number of plural values of oxygen gas maxima used to calculate the average may range anywhere from 2 and 10. Even further, an estimated level of carbon dioxide gas is determined (S6). Namely, the difference between the derived average maximum oxygen level and an instantaneous level of oxygen gas may be employed to derive an estimated instantaneous level of carbon dioxide gas. FIG. 8 shows the derived instantaneous carbon dioxide gas level versus time as derived from the instantaneous oxygen gas level using the methods shown in FIG. 7. This calculation advantageously works for any level of oxygen detected on inspiration, including air or oxygen enriched air, and the difference in readings between inspiration and exhalation are caused by the presence of carbon dioxide gas from the lungs. The calculation may be further improved by subtracting the partial pressure of water vapor from the calculated carbon dioxide value. Partial pressure of water vapor is assumed to be saturated for exhaled air.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A capnography system for measuring oxygen comprising:
    an optical fiber including a proximal end and a distal end;
    an optical sensor positioned adjacent to the distal end of the optical fiber, the optical sensor comprising:
        a substrate having a first and a second surface opposite the first surface;
        a first coating layer applied on the first surface of the substrate, the first coating layer including a first fluorophore having a fluorescence characteristic that is dependent upon temperature; and
        a second coating layer applied on the first coating layer or on the second surface of the substrate, the second coating layer including an oxygen permeable matrix and a second fluorophore having a fluorescence characteristic that is dependent upon temperature and oxygen concentration;
    an excitation source that transmits light from the proximal end of the optical fiber to the distal end of the optical fiber to excite the first and second fluorophores of the optical sensor; and
    a fluorescence emission sensor that receives one or more fluorescence characteristics from each of the first and second fluorophores travelling from the distal end of the optical fiber to the proximal end of the optical fiber.

2. The system of claim 1, further comprising:
    a graphical display operably connected to the emission fluorescence sensor.

3. The system of claim 1, further comprising:
an audio device operably connected to the emission fluorescence sensor, the audio device including an alarming mechanism sensitive to a signal exceeding a predetermined threshold.

4. The system of claim 1, further comprising:
a wireless display connected to the fluorescence emission sensor for assessing a signal from a remote location.

5. The system of claim 1, further comprising an oxygen barrier layer applied between the first coating layer and the second coating layer.

6. The system of claim 1, wherein the second coating layer includes an oxygen impermeable matrix.

7. The system of claim 1, wherein the substrate is oxygen impermeable.

8. The system of claim 1, wherein the oxygen permeable matrix includes polystyrene and the oxygen impermeable matrix includes sol gel.

9. The system of claim 1, wherein the first and second fluorophores are selected from Ruthenium organic complexes, Platinum organic complexes and combinations thereof.

10. The system of claim 9, wherein the first fluorophore is a Ruthenium organic complex.

11. The system of claim 9, wherein the second fluorophore is a platinum organic complex.

12. The system of claim 1, wherein the fluorescence characteristic is selected from fluorescence intensity, decay rate, lifetime, phase shift and combinations thereof.

13. The system of claim 1, wherein the substrate includes a material selected from acrylic, quartz, clear plastics and combinations thereof.

\* \* \* \* \*